US011148812B2

United States Patent
Last et al.

(10) Patent No.: US 11,148,812 B2
(45) Date of Patent: Oct. 19, 2021

(54) UPHOLSTERY-GUIDED FOOTREST

(71) Applicant: Textron Aviation Inc., Wichita, KS (US)

(72) Inventors: Brent William Last, Wichita, KS (US); Gregory Lynn Ellis, Clearwater, KS (US); Brandon Riley Shannon, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 83 days.

(21) Appl. No.: 16/719,525

(22) Filed: Dec. 18, 2019

(65) Prior Publication Data

US 2020/0216179 A1 Jul. 9, 2020

Related U.S. Application Data

(60) Provisional application No. 62/787,853, filed on Jan. 3, 2019.

(51) Int. Cl.
*B64D 11/06* (2006.01)
*A47C 7/50* (2006.01)

(52) U.S. Cl.
CPC ........ *B64D 11/0643* (2014.12); *A47C 7/5068* (2018.08); *B64D 11/0647* (2014.12)

(58) Field of Classification Search
CPC ..... A47C 7/506; A47C 1/0345; A47C 7/5066; B60N 2/995; B64D 11/0647
See application file for complete search history.

(56) References Cited

U.S. PATENT DOCUMENTS

| | | | | |
|---|---|---|---|---|
| 4,669,778 A | * | 6/1987 | Rogers, Jr. | A47C 7/506 297/85 L |
| 4,844,539 A | * | 7/1989 | Seibert | A47C 31/11 297/228.13 |
| 5,192,113 A | * | 3/1993 | Wiecek | A47C 1/0345 297/68 |
| 5,588,708 A | * | 12/1996 | Rykken | A47C 7/506 297/423.2 |
| 5,836,645 A | * | 11/1998 | Sakaue | A47C 1/0342 297/68 |
| 7,607,732 B2 | * | 10/2009 | Beroth | B60N 2/6054 297/219.1 |
| 10,160,357 B2 | * | 12/2018 | Galbreath | B60N 2/5825 |
| 2006/0186721 A1 | * | 8/2006 | Flory | B60N 3/063 297/423.36 |
| 2018/0162534 A1 | * | 6/2018 | Jakubowski | B64D 11/0647 |

FOREIGN PATENT DOCUMENTS

| | | |
|---|---|---|
| EP | 1118294 A2 | 7/2001 |
| WO | 2007019893 A1 | 2/2007 |

* cited by examiner

*Primary Examiner* — Sarah B McPartlin
(74) *Attorney, Agent, or Firm* — Erise IP, P.A.

(57) ABSTRACT

An upholstery-guided footrest includes a footrest mechanically coupled to a seat. The footrest is configured for moving between a stowed position and one or more deployed positions. A flexible member has a first end and a second end opposite the first end. The first end is fastened to the seat and the second end is fastened to the footrest such that the flexible member supports the footrest during stowing. The flexible member bends around a frontside of the seat and is configured to guide and support the footrest into a stowed position.

20 Claims, 13 Drawing Sheets

UPHOLSTERY-GUIDED FOOTREST

CROSS-REFERENCE TO RELATED APPLICATIONS

This application claims the benefit of U.S. Provisional Application No. 62/787,853 entitled "Upholstery-Driven Footrest" and filed on Jan. 3, 2019, which is herein incorporated by reference in its entirety.

BACKGROUND

1. Field of the Disclosure

Embodiments of this disclosure relate generally to aircraft seats. More specifically, embodiments of this disclosure relate to stowable footrests for aircraft passenger seats.

2. Description of the Related Art

Existing seat footrests for aircraft may be heavy or difficult to stow due to excessive spring forces needed to deploy the footrest. Additionally, many existing seat footrests are unable to reach a horizontal position. U.S. Pat. No. 8,444,225 to Behe discloses a legrest with a lockable gas spring cylinder and a foot support that telescopically extends from a calf support. U.S. Pat. No. 8,444,226 to Driessen et al. discloses a leg rest assembly with a gas spring. U.S. Pat. No. 6,695,406 to Plant discloses a reclinable passenger seat with a legrest extension diaphragm that telescopes to lengthen or shorten the overall length of the legrest. U.S. Pat. No. 5,352,020 to Wade et al. discloses two hydraulic locking cylinders for extending and retracting the footrest, respectively. U.S. Pat. No. 4,819,987 to Stringer discloses a legrest that is extended by an actuation assembly that includes a hydraulic actuator of the piston/cylinder type. U.S. Application 2014/0292052 to Parker et al. discloses a reclining lounger chair that includes a gas spring connected to a set of linkages to extend a seat footrest.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

An upholstery-guided footrest includes a footrest mechanically coupled to a seat, the footrest being configured for moving between a stowed position and one or more deployed positions, and a flexible member having a first end and a second end opposite the first end, the first end being fastened to the seat and the second end being fastened to the footrest such that the flexible member supports the footrest during stowing.

A seat footrest includes a footrest attached to a seat, the footrest being stowable. A flexible member is fastened to the seat and the footrest. While stowing the footrest, the flexible member bends around a frontside of the seat and is configured to guide and support the footrest into a stowed position.

BRIEF DESCRIPTION OF THE DRAWINGS

Illustrative embodiments of the present disclosure are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure include a seat footrest having a non-stretchy and flexible member internal to an upholstery fabric of the footrest that assists with movement of the footrest during stowing. The footrest stows in front of, and partially beneath, a bottom cushion of the seat. As the footrest is deployed, it rotates upwardly and simultaneously extends away from the seat to provide a longer footrest. When the footrest is returned to the stowed position, the flexible member causes the footrest to automatically retract as it rotates downwardly into the stowed position.

Figure 1:
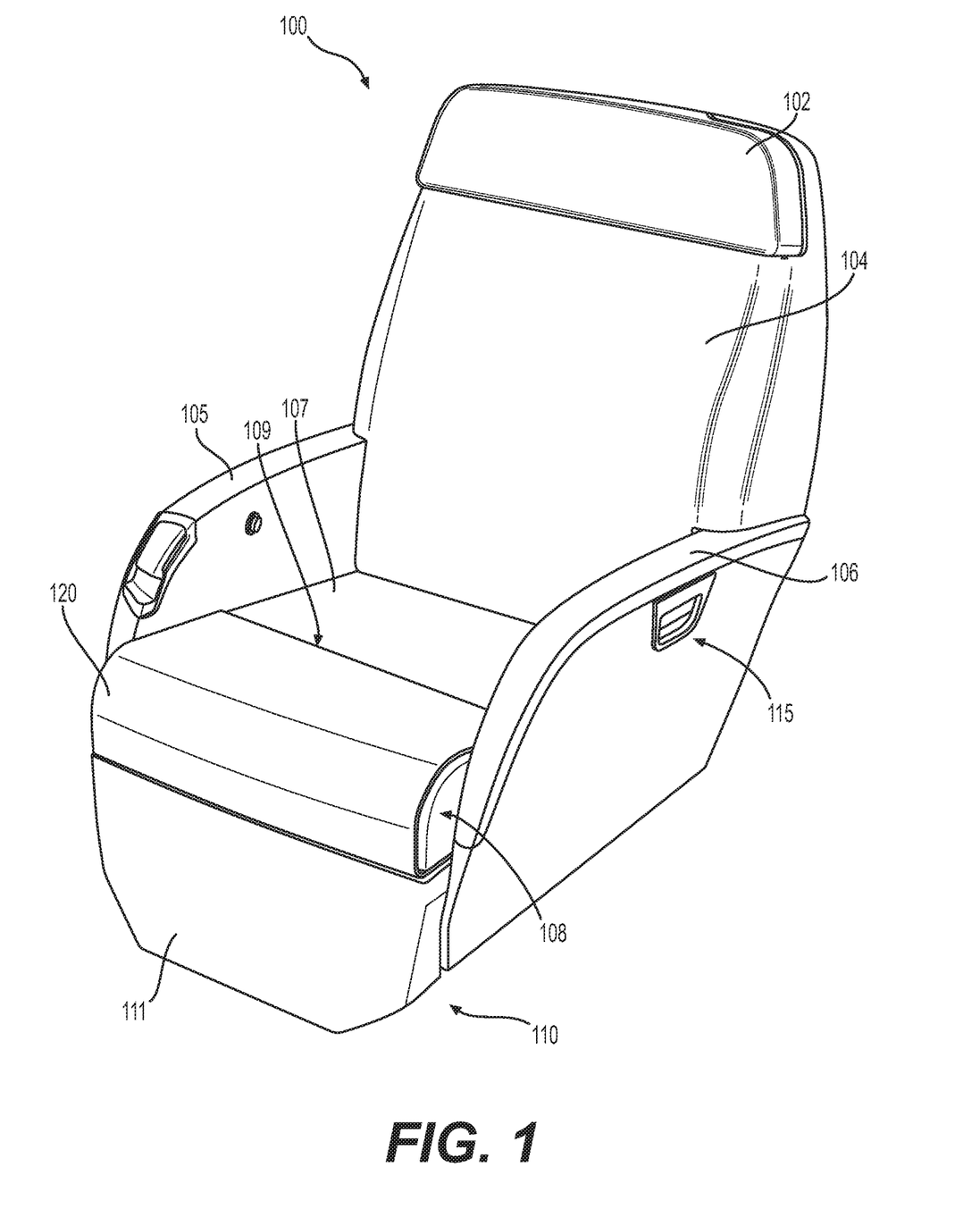
FIG. 1 is a perspective view showing a seat with an upholstery-guided footrest in a stowed position, in an embodiment.
Figure 2:
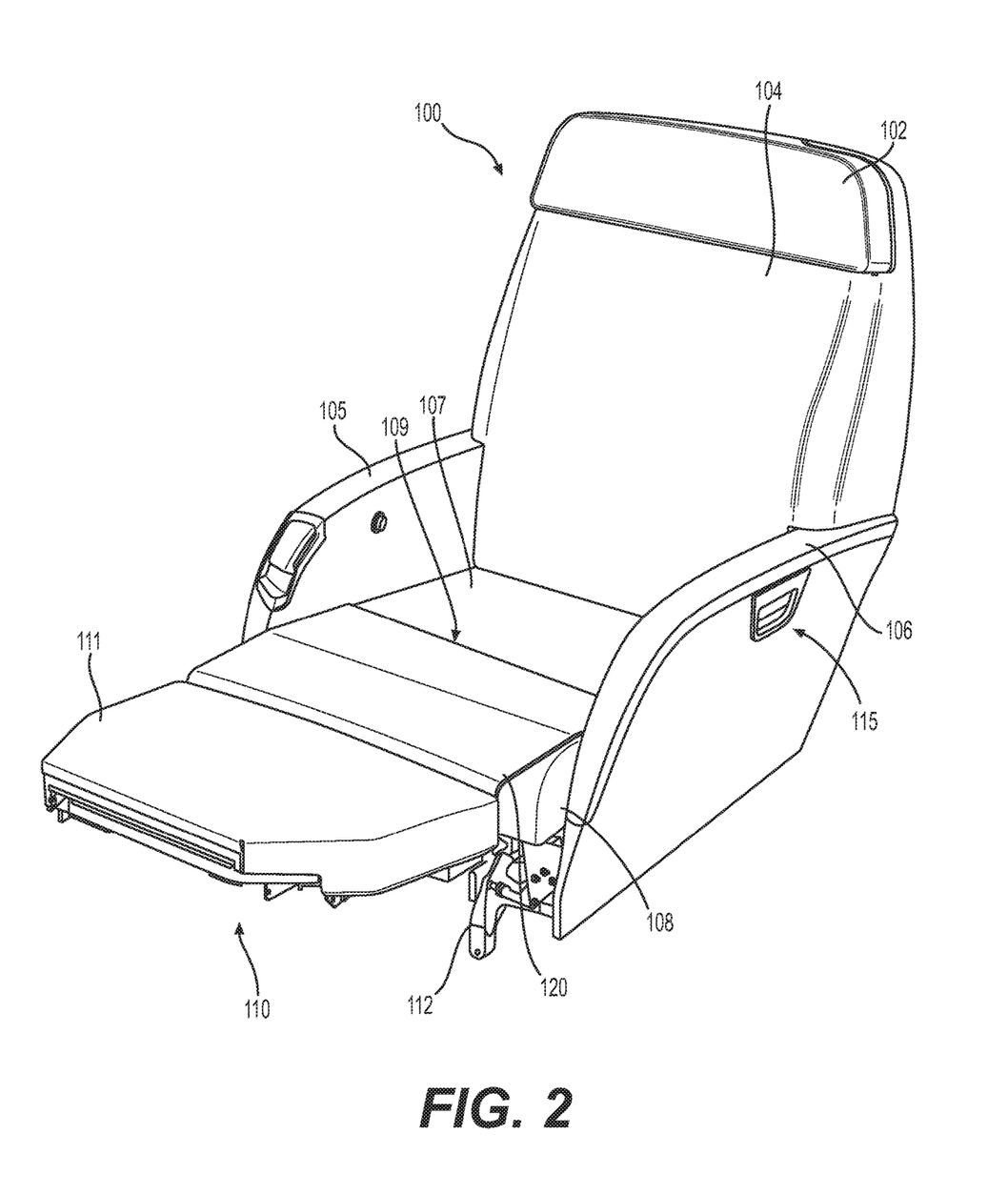
FIG. 2 is a perspective view showing the seat with the upholstery-guided footrest in a deployed position.

FIG. 1 is a perspective view showing a seat 100 with an exemplary footrest 110 in a stowed position. FIG. 2 is a perspective view showing seat 100 with footrest 110 in a fully deployed position. FIGS. 1 and 2 are best viewed together with the following description. Seat 100 includes a headrest 102, a back 104, a right armrest 105, a left armrest 106, and a bottom cushion 107, which are adapted for supporting a seated occupant. A release handle 115 enables a user to release footrest 110 for deployment via a cable and locking mechanism, which are described below in connection with FIG. 6. Footrest 110 includes a footrest cushion 111. In certain embodiments, footrest cushion 111 is removable, as further described below in connection with FIG. 11.

A flexible member 120 is fastened to footrest 110 and seat 100 and is adapted to support footrest 110 during and after stowing of the footrest. Specifically, flexible member 120 provides a tensile strength that is used to support and guide the footrest during stowing. Flexible member 120 is made of one or more bendable materials such that it may bend around cushion 107 and assume the shape of the cushion when the footrest is stowed (see side view in FIG. 5). At least one of the bendable materials is non-stretchy such that the length of flexible member 120 is maintained when loaded by footrest 110. In the present disclosure, non-stretchy should be construed to mean that substantially no elongation occurs under an expected load. The expected load is the weight of footrest 110 plus any additional forces incurred during the stowing process.

Bottom cushion 107 includes a frontside 108 that comprises the forward-facing portion of the cushion. In certain embodiments, frontside 108 has a particular shape that is adapted for assisting with stowing of footrest 110. For example, the frontside 108 may include a rounded portion, and the rounded portion may be shaped with a particular size and a particular curvature adapted to provide a predetermined outer length that matches a length of flexible member 120 when footrest 110 is stowed.

In certain embodiments, flexible member 120 has one or more straps of a non-stretchy material embedded within a cover. The one or more straps are for example nylon straps that are sewn into the cover and extend lengthwise between the first end and the second end of flexible member 120. The cover is a tailoring made of a fabric suitable for providing an upholstered finish, such as leather. Although the cover may be made of a stretchy material, when supported by the non-stretchy material, flexible member 120 is functionally non-stretchy. In some embodiments, a broad nylon strap is provided as a backing of the cover that spans a width of the cover.

Attachment of flexible member 120 includes a first end being fastened (e.g., sewn) to seat 100 and a second end being fastened (e.g., clamped) to footrest 110. As used herein, the term "fastened" is intended to broadly indicate any suitable means used to connect two or more items together, including but not limited to sewn, clamped, stapled, glued, bolted, screwed, riveted, adhered, etc. In certain embodiments, the first end of flexible member 120 is fastened to bottom cushion 107. For example, the first end may be fastened to a back side of bottom cushion 107 (e.g., beneath back 104) or directly to the seat back 104. Alternatively, the first end may be fastened to bottom cushion 107 within a seam 109. For example, bottom cushion 107 may include two sections with a seam 109 therebetween such that the first end of flexible member 120 is fastened to one or both sections of cushion 107 within seam 109 so as to be hidden from view. In some embodiments, flexible member 120 is fastened to bottom cushion 107 via a substantial portion rather adjacent the first end via a narrow portion. For example, a substantial area of flexible member 120 may be directly sewn (e.g., via an upholstery-style pattern) into a top side of bottom cushion 107.

Figure 3:
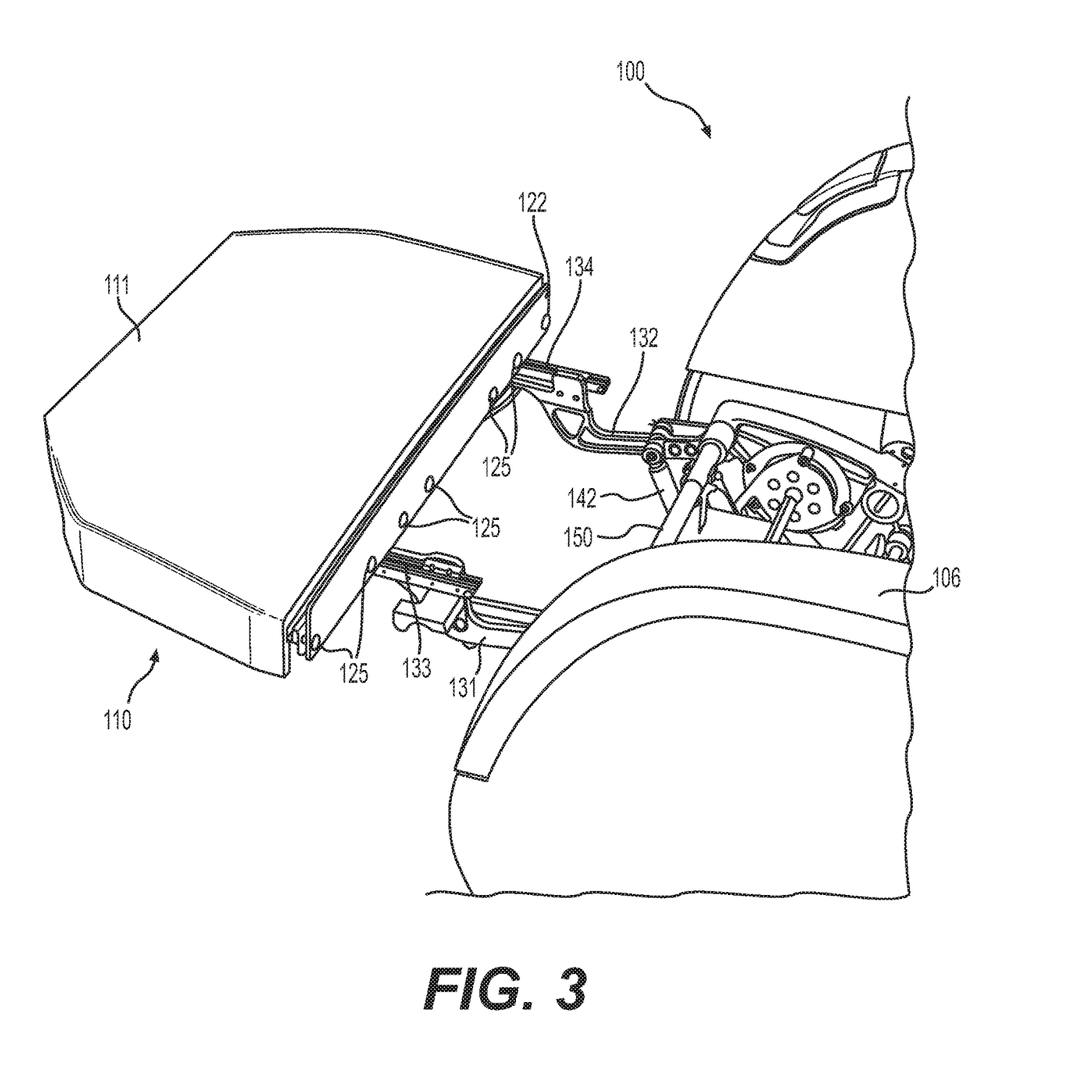
FIG. 3 is a perspective view showing the upholstery-guided footrest of FIG. 1 with some components removed for viewing internal components.

FIG. 3 is a perspective view showing footrest 110 in the fully deployed position with flexible member 120 and bottom cushion 107 removed to enable viewing of internal components. Footrest 110 is slidable upon a pair of carriages that extend from a pair of supports. Specifically, a first carriage 133 extends from a first support 131 and a second carriage 134 extends from a second support 132. First and second supports 131, 132 are pivotally coupled to an axle 150. A first extending member 141 and second extending member 142 are adapted for extending during deployment of footrest 110. First and second extending members 141, 142 are for example compression springs or gas springs.

A clamp 122 is adapted for securing the second end of flexible member 120 to footrest 110. Clamp 122 is for example an aluminum member shaped to match the shape of an inner edge of footrest 110. A plurality of fasteners 125 may be used to fasten clamp 122 to footrest 110. Fasteners 125 are for example screws that thread into threaded receptacles of footrest 110. By tightening fasteners 125, a gap between clamp 122 and footrest 110 may be narrowed for securing the end of flexible member 120. In certain embodiments, fasteners 125 are located along a lower portion of clamp 122 to provide space along the upper portion of clamp 122 for receiving the second end of flexible member 120. In some embodiments, fasteners pass through holes in flexible member 120.

Returning to FIG. 2, footrest 110 is fully deployed in front of seat 100 to a substantially horizontal orientation. In the present disclosure, substantially horizontal should be construed to mean substantially parallel with the floor upon which seat 100 rests. Available positions of footrest 110 include fully deployed (as depicted in FIG. 2), stowed (as depicted in FIG. 1), or partially deployed (not shown). Partially deployed positions may include one or more positions in which footrest 110 is angled between the fully stowed and fully deployed positions. Fully and partially deployed positions may be used by a seated occupant for reclining in seat 100. The fully deployed position also enables the user to lie down when seat back 104 is lowered to a substantially horizontal position. A base 112 is adapted for mounting seat 100 to an aircraft cabin floor and may include a swiveling capability (not shown) for rotating the orientation of seat 100 and a forward/aft and side-to-side translating abilities (not shown).

Figure 4:
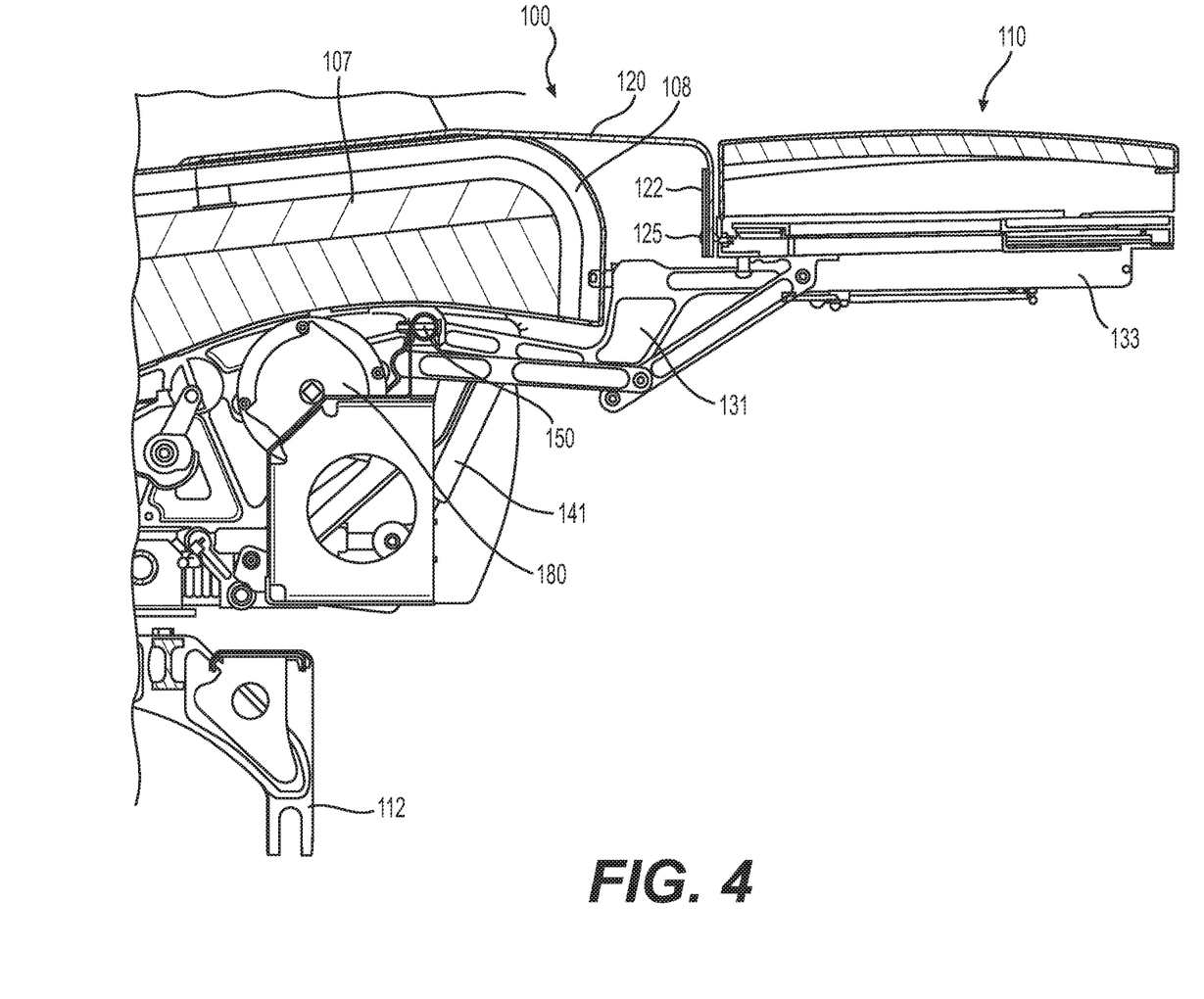
FIG. 4 is a cross-sectional side view showing the right-hand side of a seat with the footrest in the fully deployed position, in an embodiment.

FIG. 4 is a cross-sectional side view showing the right-hand side of seat 100 with footrest 110 in the fully deployed position. When deployed, footrest 110 is rotated upwards and extended outwards along first carriage 133 and second carriage 134 causing flexible member 120 to be separated from frontside 108 of cushion 107. In the deployed position, flexible member 120 provides an upholstered surface that bridges the gap between bottom cushion 107 and footrest 110, thereby hiding components used to deploy the footrest from a user seated in seat 100. A locking mechanism 180 enables footrest 110 to be secured in any position and released by a user via release handle 115, as further described below in connection with FIG. 6.

Figure 5:
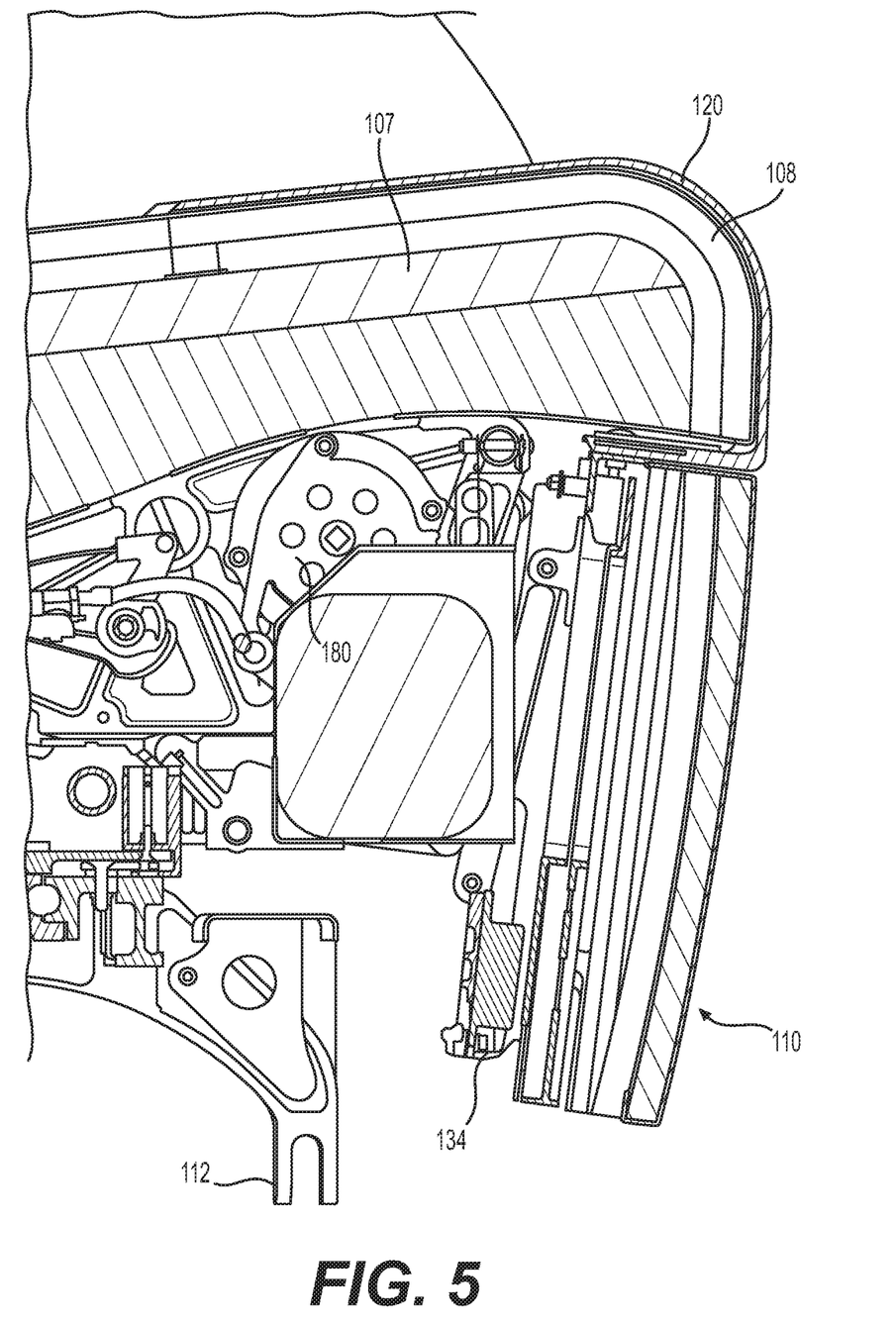
FIG. 5 is a cross-sectional side view showing the right-hand side of the seat of FIG. 4 with the footrest in the fully stowed position.

FIG. 5 is a cross-sectional side view showing the right-hand side of seat 100 with footrest 110 in the fully stowed position. When stowed, footrest is rotated inwards and flexible member 120 wraps around frontside 108 of cushion 107 to match the curved shape of frontside 108. Flexible member 120 causes footrest 110 to retract along first and second carriages 133, 134 while the footrest is being stowed.

Figure 6:
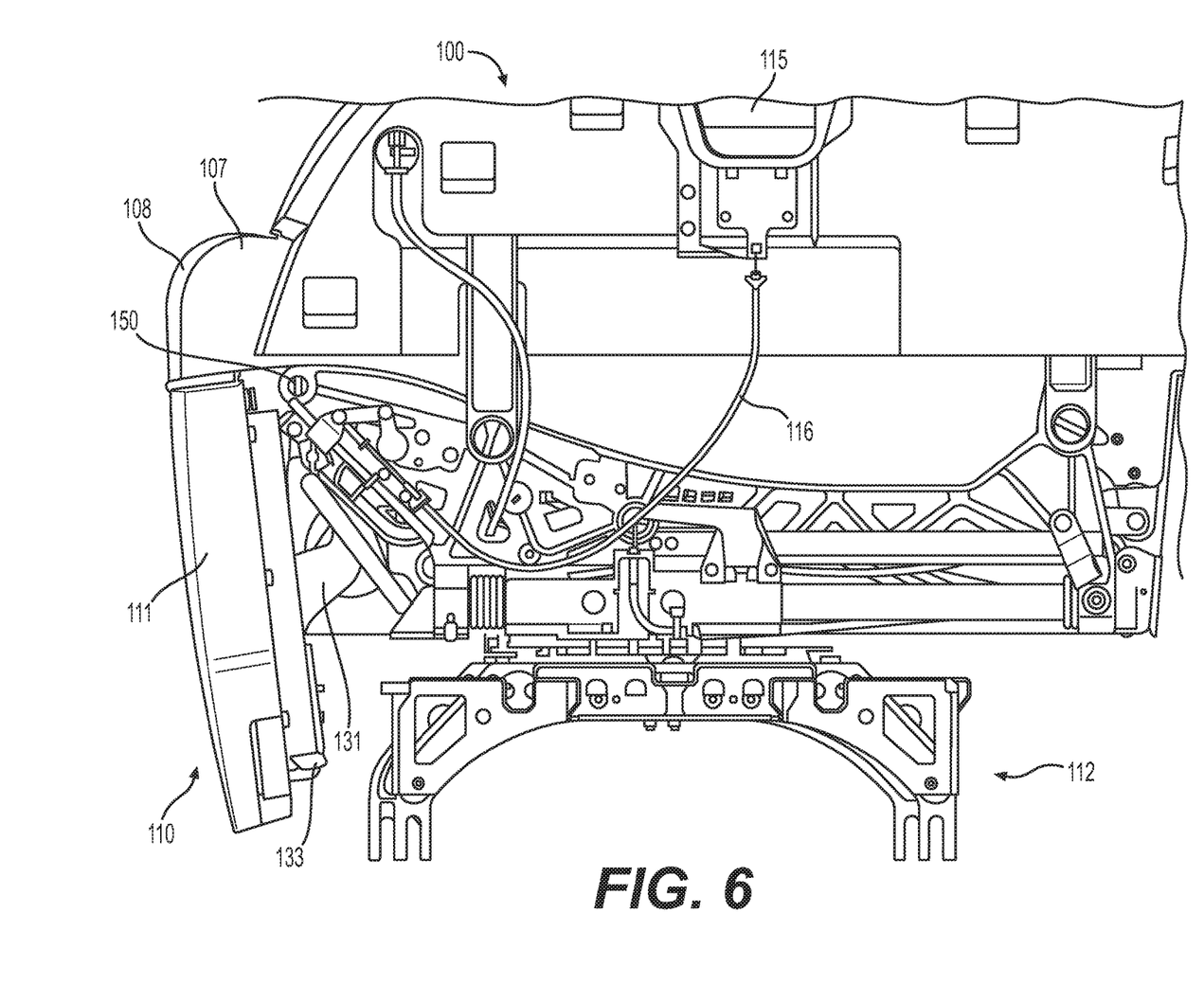
FIG. 6 is a side view showing the left-hand side of the seat of FIG. 1 with some components removed for viewing internal components.

FIG. 6 is a side view showing the left-hand side of seat 100 with footrest 110 in a stowed position. Outer portions of seat 100 are removed in FIG. 6 for viewing internal components of seat 100. When stowed, footrest 110 is receded along the carriages (e.g., footrest 110 is fully receded along carriage 133).

Release handle 115 is mechanically coupled with a cable 116 used to release locking mechanism 180 (see FIG. 4 and FIG. 5) for freeing footrest 110 to initiate deployment. While release handle 115 is triggered by a user, locking mechanism 180 is free to rotate, which enables movement of footrest 110 via a drive link 135 (see FIG. 9) coupled with first support 131. When handle 115 is released, the locking mechanism is locked, which secures footrest 110 in its current position.

Figure 7:
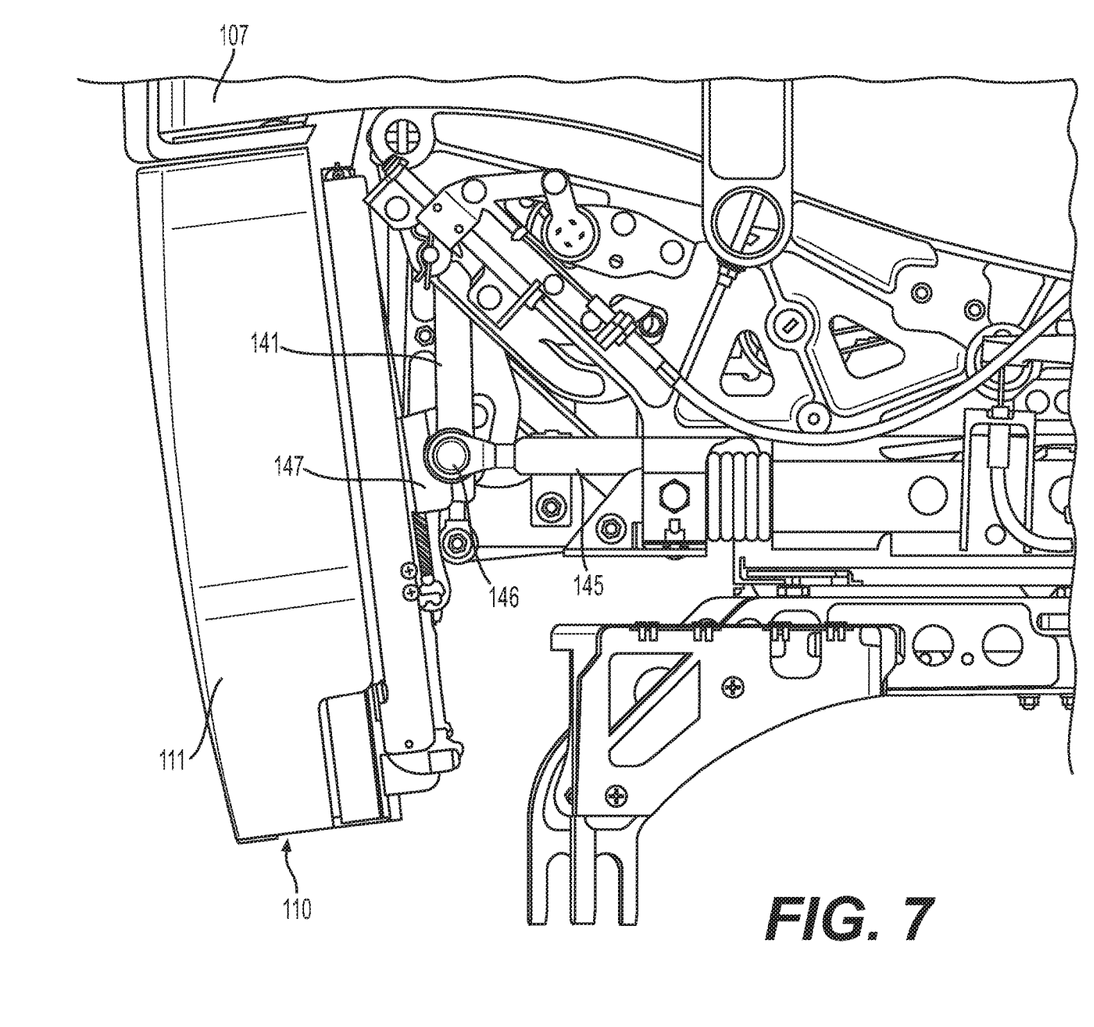
FIG. 7 is another side view showing the left-hand side the seat of FIG. 1 with the footrest in the fully stowed position and some components removed for viewing internal components.

FIG. 7 is a side view showing the left-hand side of seat 100 with footrest 110 in the fully stowed position. Some components of seat 100 are removed in FIG. 7 to enable a view of internal components. When stowed, footrest 110 is oriented past vertical (e.g., at a negative angle) such that footrest 110 angles under frontside 108 of bottom cushion 107. Also when footrest 110 is stowed, first and second extending members 141, 142 are adapted to rotate "over-center" such that they are substantially vertically oriented, as depicted for first extending member 141 in FIG. 7. In other words, the upper pivot point of extending members 141, 142 passes over the respective lower pivot point during the final stage of stowing. By rotating over center, first and second springs assist with completing the stowing of footrest 110 up and under bottom cushion 107.

A kickout spring 145 is provided to initiate deployment of footrest 110 after it has been released via release cable 116. Kickout spring 145 is for example a compression spring or a gas spring. Attached to a protruding end of kickout spring 145 is a bearing 146. Upon release of footrest 110, kickout spring 145 extends causing bearing 146 to press outwardly on a catch bracket 147 attached to first support 131 thereby initiating deployment of footrest 110.

Figure 8:
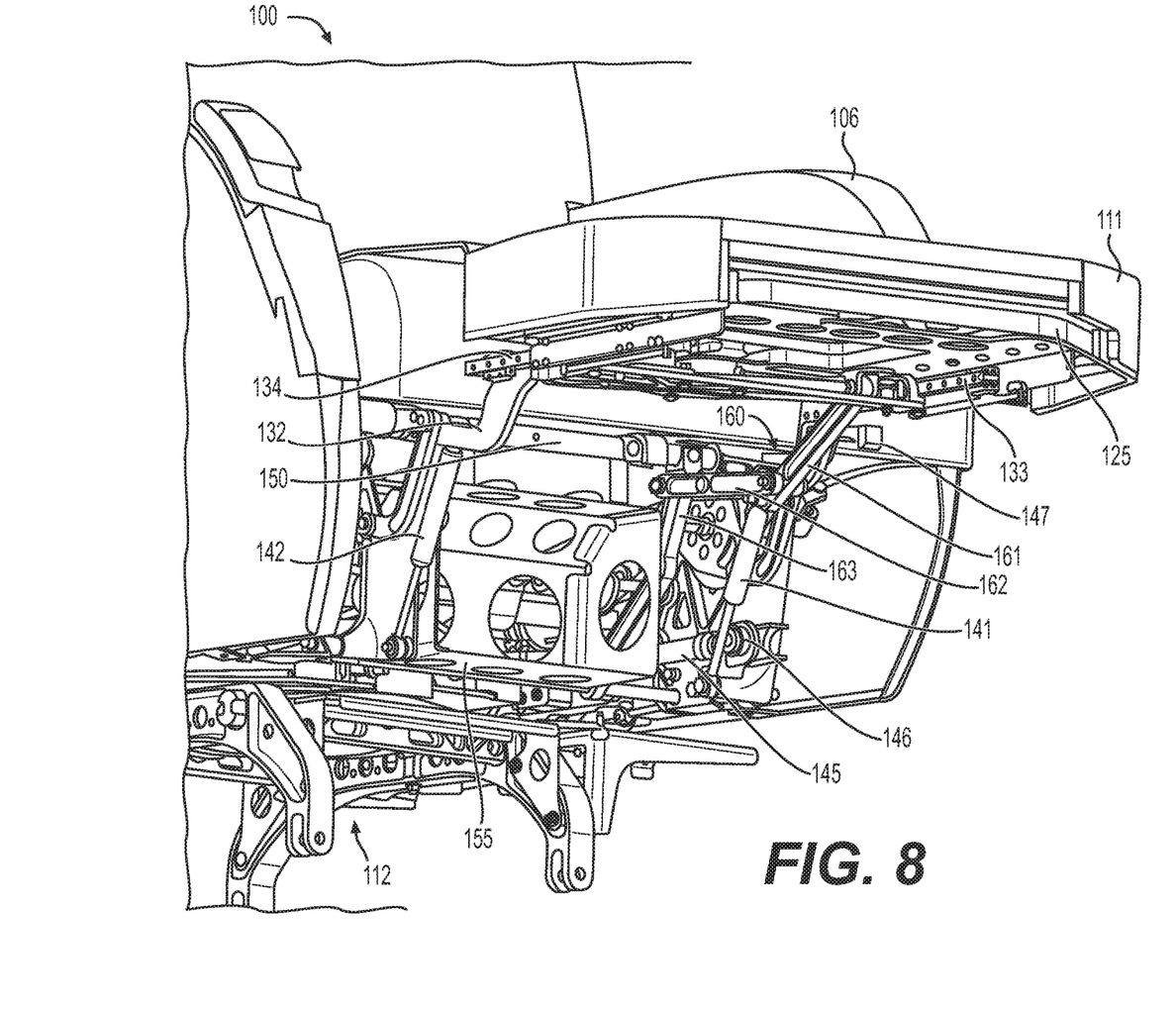
FIG. 8 is a perspective view showing an upholstery-guided footrest in a deployed position, in an embodiment.
Figure 9:
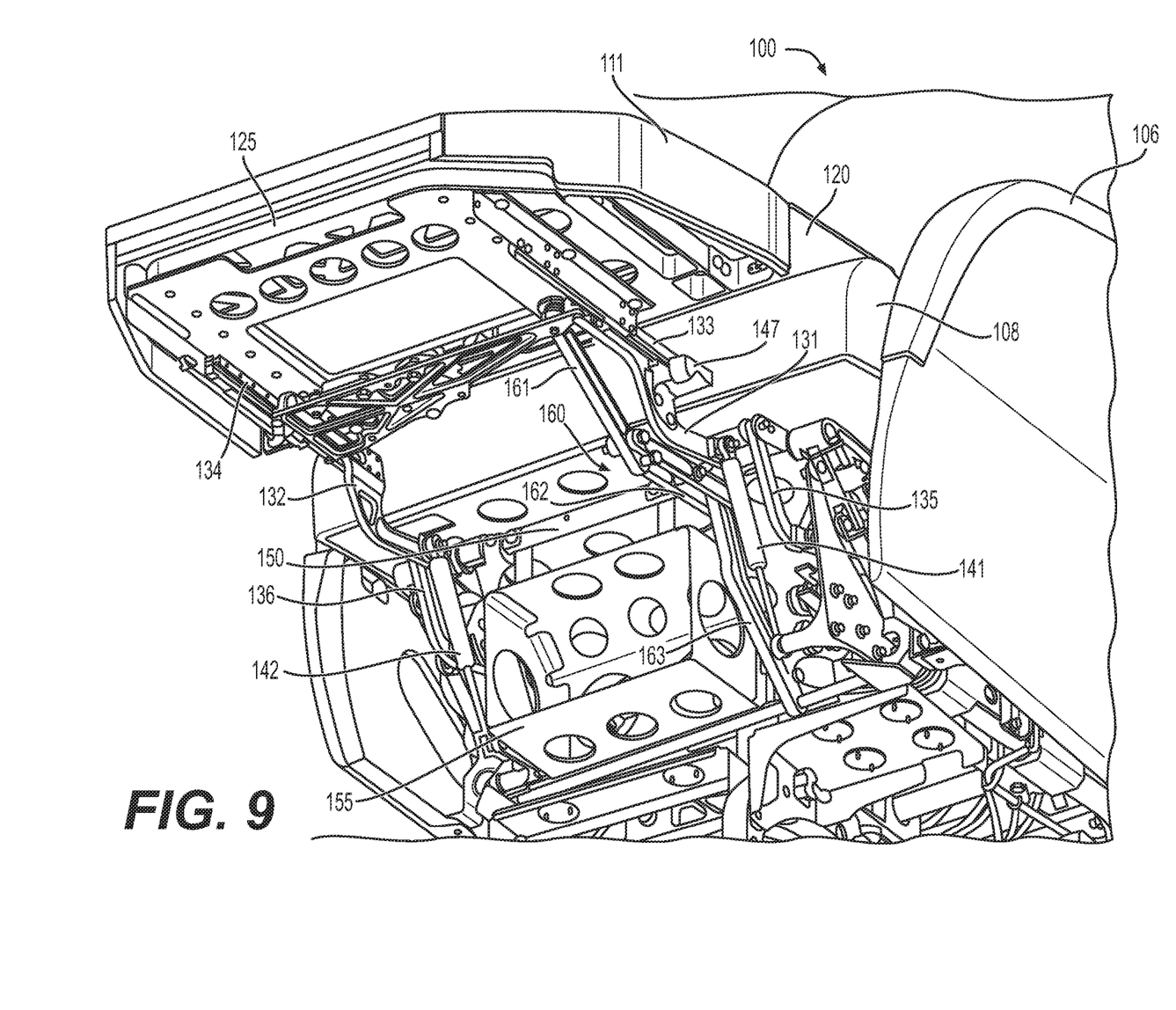
FIG. 9 is another perspective view of the upholstery-guided footrest of FIG. 8.

FIGS. 8 and 9 are perspective views showing seat 100 with footrest 110 in the fully deployed position. FIGS. 8 and 9 are best viewed together with the following description. First and second extending members 141, 142, which are each pivotally mounted at both ends, are extended and angled forwardly while footrest 110 is deployed, as depicted in FIGS. 8 and 9. Attached to an exposed end of kickout spring 145 is a bearing 146, which is best viewed in FIG. 8. Bearing 146 is adapted to contact catch bracket 147 while footrest 110 is being stowed. As an occupant of seat 100 presses inwardly on footrest 110 to complete the stowing process, bearing 146 receives catch bracket 147 and kickout spring 145 is compressed. A life vest box 155 is adapted for storing a life vest and may be accessed through a port in the base of footrest 110 by removing the footrest cushion (see FIG. 11).

Footrest 110 is slidable along first and second carriages 133, 134. The carriages provide tracks having rollers, wheels, bearings, and/or plain bearings that enable a low-friction sliding movement of the footrest for extending and retracting. A cable reel may be used to automatically extend footrest 110 along carriages 133, 134 as the footrest is deployed, as further described below in connection with FIG. 12.

Drive link 135 (viewable in FIG. 9) couples locking mechanism 180 with first support 131. In certain embodiments, locking mechanism 180 includes more than one rotary locking mechanism. For example, a first locking mechanism couples with first support 131 via first drive link 135 and second locking mechanism couples with second support 132 via and a second drive link 136.

A supporting linkage 160 supports footrest 110 and helps guide the footrest 110 through the last portion of the stowing motion (e.g., as footrest 110 is secured beneath the seat cushion as shown in FIG. 6). Additionally, supporting linkage 160 prevents the footrest from moving below a predetermined lower limit due to compression of bottom cushion 107 (e.g., while seat 100 is occupied). Although flexible member 120 provides support of footrest 110 while stowed, the footrest position is based on a length of flexible member 120 in combination with a shape of frontside 108 of bottom cushion 107. If the cushion is depressed such that the shape of frontside 108 is changed, this may increase an effective length of flexible member 120 such that footrest 110 sags lower than intended. Supporting linkage 160 maintains footrest 110 in the correct stowed position despite any compression of the cushion.

Figure 10:
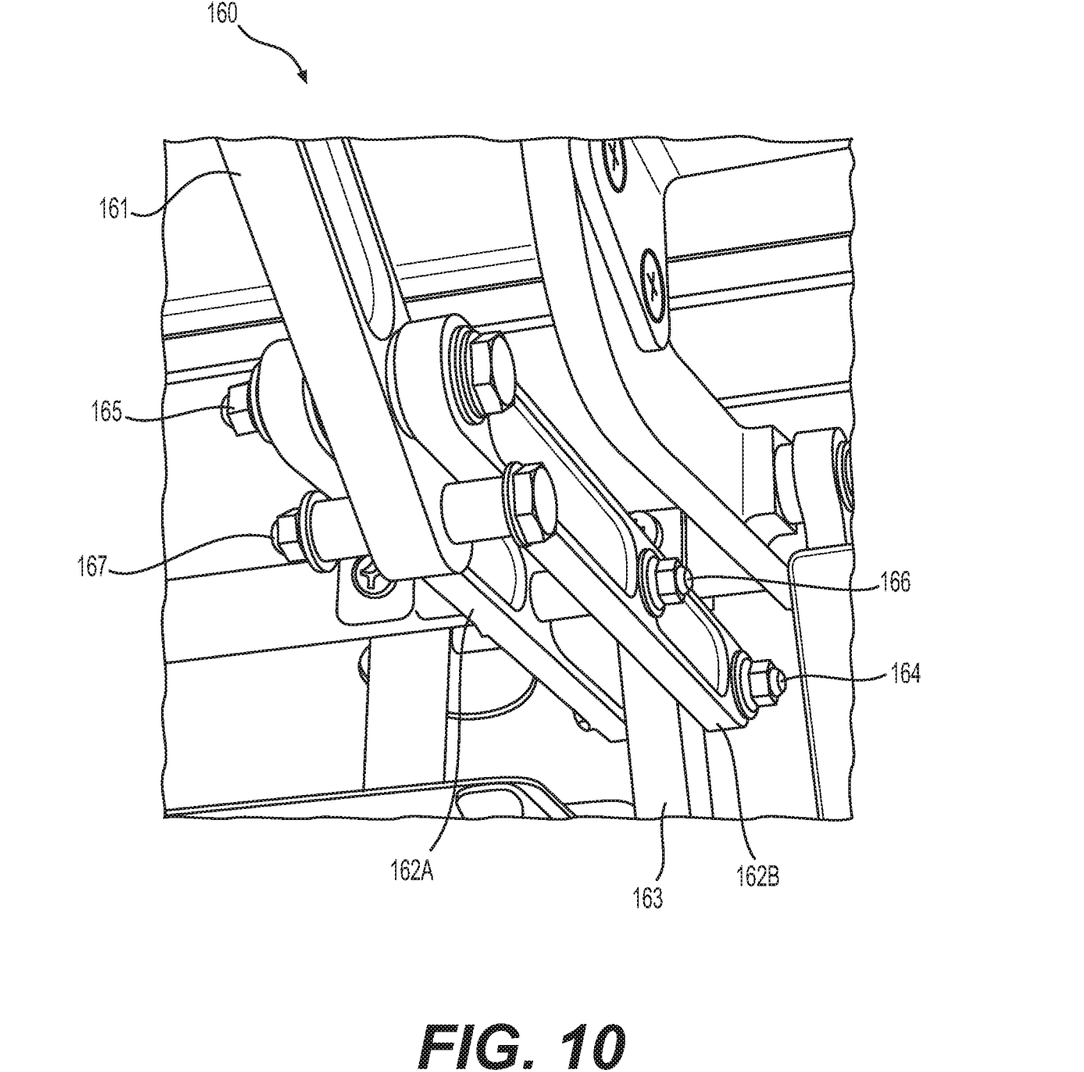
FIG. 10 is a perspective view showing an embodiment of a supporting linkage of the upholstery-guided footrest of FIGS. 8 and 9.

As best viewed in FIG. 10, supporting linkage 160 includes a first pivoting member 161, a second pivoting member 162, and a stationary member 163. First pivoting member 161 pivotally couples footrest 110 with second pivoting member 162, which pivotally couples to stationary member 163. Second pivoting member 162 includes two parallel bars, a first bar 162A and a second bar 162B (see FIG. 10), with a gap therebetween adapted to straddle first pivoting member 161 and stationary member 163. This enables first and second pivoting members 161, 162 to fold together into a collapsed configuration upon stowing of footrest 110. In other words, while supporting linkage 160 is in the collapsed configuration, first pivoting member 161 and stationary member 163 are interposed between the bars of second pivoting member 162. Upon stowing of footrest 110, first pivoting member and second pivoting member rotate to the collapsed configuration for maintaining the correct stowed position and to avoid sagging of the footrest.

As depicted in FIG. 10, supporting linkage 160 includes a first pin 164 that allows second pivoting member 162 to pivot with respect to stationary member 163. A second pin 165 allows first pivoting member 161 to pivot with respect to second pivoting member 162. First and second pins are for example bolts that provide a pivoting axis. A third pin 166 passes through first bar 162A and second bar 162B of second pivoting member 162 and is adapted to contact stationary member 163 when footrest 110 is stowed and supporting linkage 160 is in the collapsed configuration. A fourth pin 167 passes through first pivoting member 161 near the end adjacent second pivoting member. When footrest 110 is fully deployed, fourth pin 167 contacts first and second bars 162A, 162B, as depicted in FIG. 10, to prevent further rotation of first pivoting member 161 with respect to second pivoting member 162.

Figure 11:
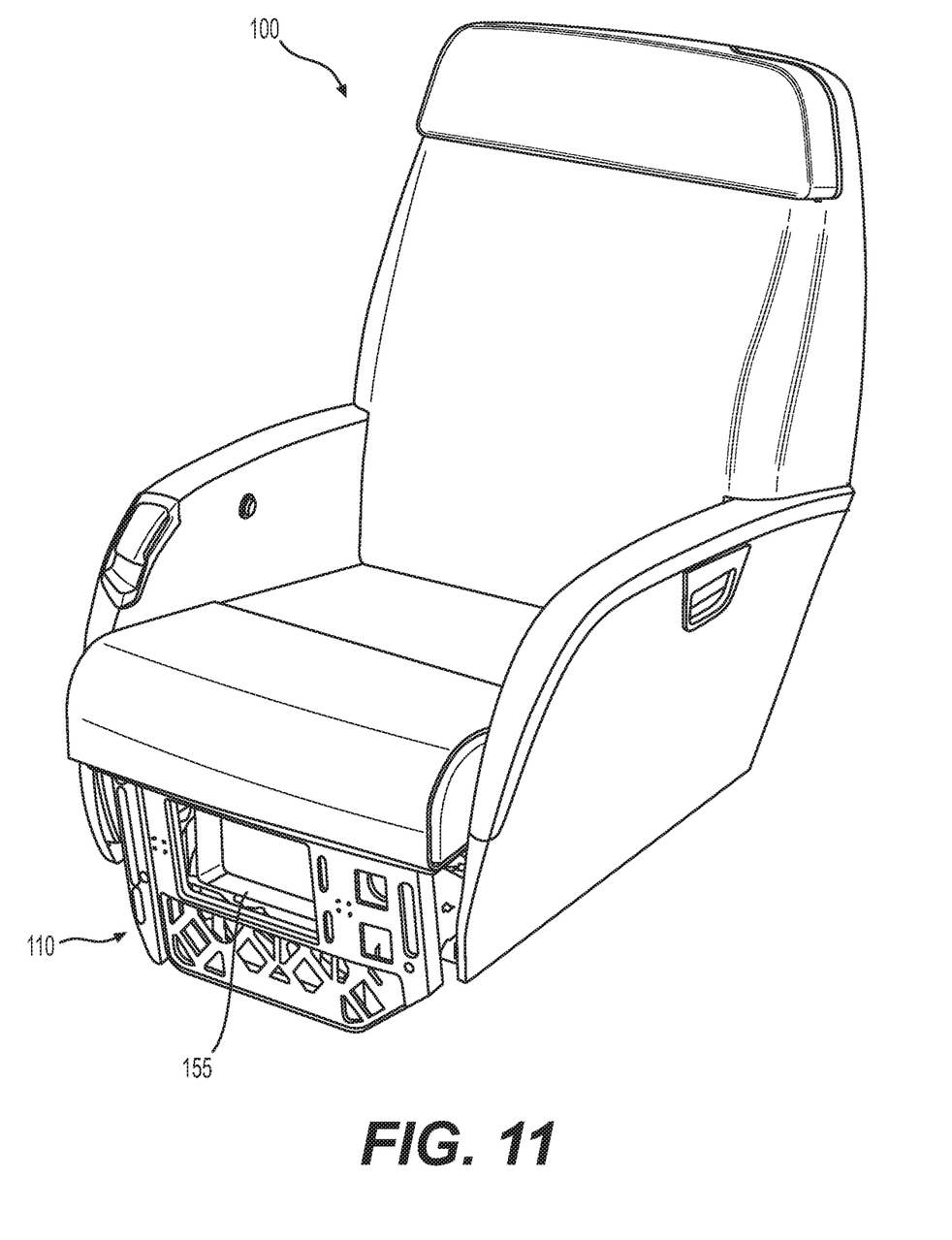
FIG. 11 is a perspective view showing an upholstery-guided footrest with a footrest cushion removed for viewing internal components, in an embodiment.

FIG. 11 is a perspective view showing seat 100 with footrest 110 in the stowed position and footrest cushion 111 removed to enable viewing of internal components. Specifically, life vest box 155 is accessible through a window in the footrest structure for accessing a life vest in case of emergency. Footrest cushion 111 is secured to the underlying structure via a plurality of tabs. The tabs are adapted to release footrest cushion 111 when the user pries it away using a moderate amount of force.

Figure 12:
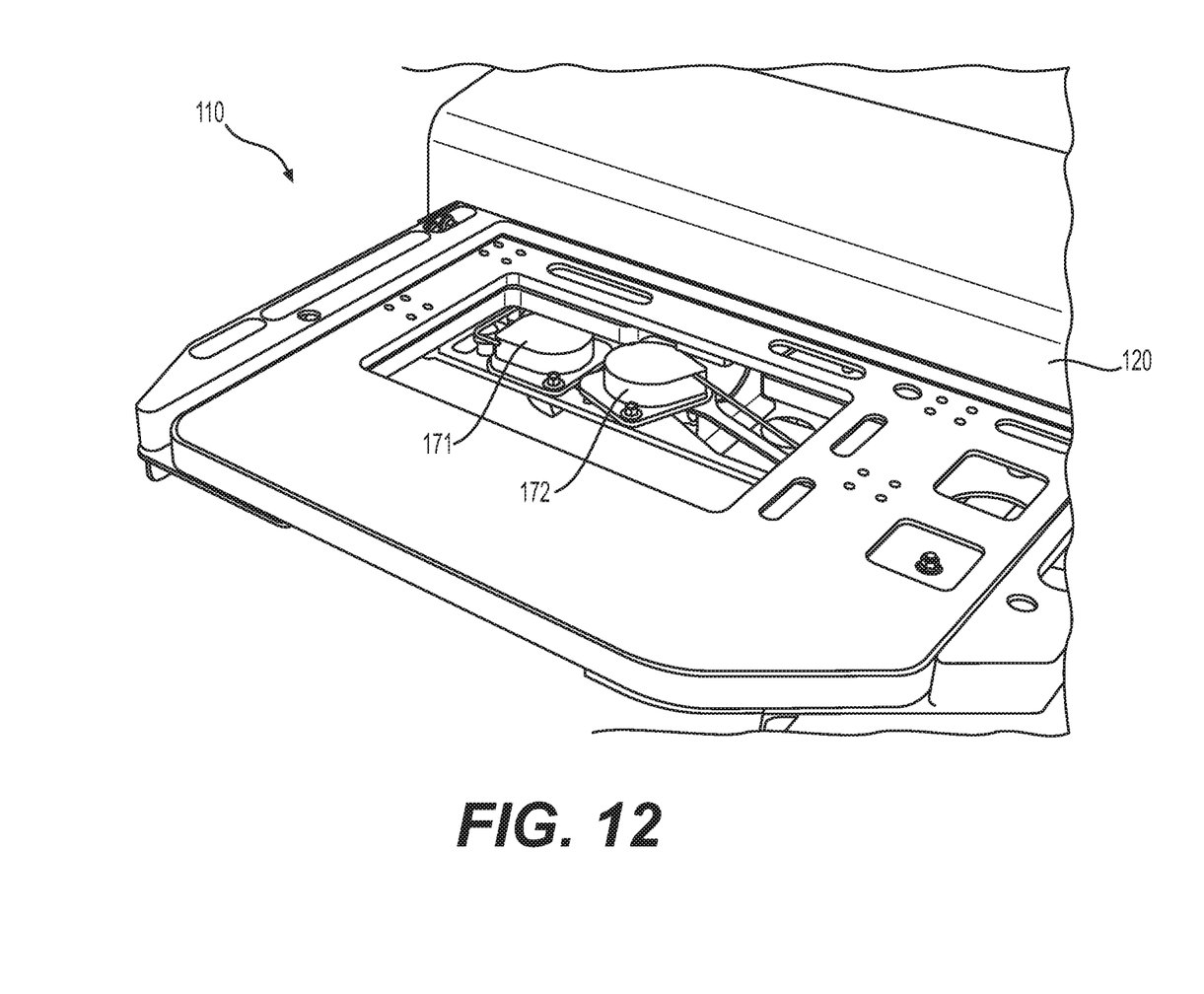
FIG. 12 is a perspective view showing an upholstery-guided footrest with pair of cable reels, in an embodiment.

FIG. 12 is a perspective view showing footrest 110 with the footrest cushion removed for viewing internal components. Specifically, a first cable reel 171 and a second cable reel 172 are visible. First and second cable reels 171, 172 are for example spring-loaded reels that automatically retract their respective cables. When footrest 110 is deployed, first and second cable reels 171, 172 pull their respective cables, which are routed via pulleys such that the footrest automatically extends along first and second carriages 133, 134 to effectively lengthen the footrest. When footrest 110 is stowed, flexible member 120 causes the footrest to retract along carriages 133, 134, and the cables are pulled out of cable reels 171, 172. In other words, the force of the stowing footrest overcomes the spring force of the reels.

Figure 13:
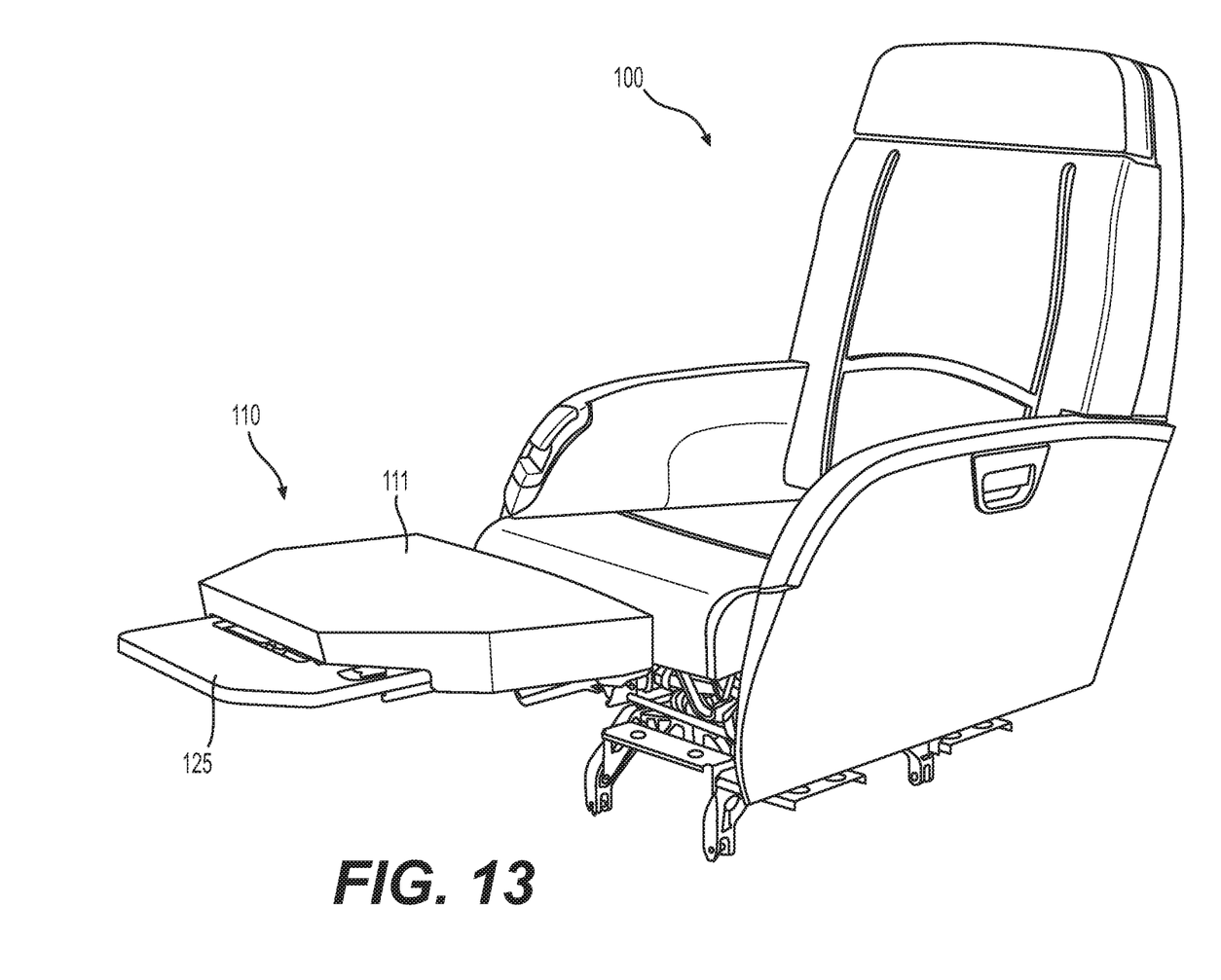
FIG. 13 is a perspective view showing an upholstery-guided footrest with a footrest extension in an extended position, in an embodiment.

FIG. 13 is a perspective view showing footrest 110 with the footrest deployed and a footrest extension 125 in an extended position. Footrest extension 125 may be manually slid to the extended position via a pair of sliding carriages on a respective pair of stationary rails housed within footrest 110 (not shown). A latch is used to secure footrest extension 125 within footrest 110. In certain embodiments, the footrest extension is manually pulled to release the latch so that extension 125 may be extended to accommodate taller occupants. In some embodiments, the footrest is pressed inwardly to release the latch so that extension 125 may be manually pulled to the extended position. Prior to stowing footrest 110, footrest extension 125 is pushed inwardly until the latch is reengaged.

In operation, footrest 110 is deployed from the stowed position by releasing locking mechanism 180 via release handle 115 and cable 116 (see FIG. 6). Once the footrest is released, kickout spring 145 (see FIG. 7 and FIG. 8) initiates deployment by pushing catch bracket 147 outwardly. After initial deployment by kickout spring 145, first and second extending members 141, 142 continue the deployment. Meanwhile, cable reels 171, 172 (see FIG. 12) extend footrest 110 along carriages 133, 134 to complete the deployment. Footrest 110 is secured in the deployed position during use via locking mechanism 180 (see FIG. 4). Following deployment of footrest 110, footrest extension 125 may be slid to an extended position (see FIG. 13) via a telescoping mechanism housed within footrest 110.

Footrest 110 is stowed by the occupant pushing downwardly and inwardly with his or her legs, after releasing locking mechanism 180 via handle 115. If footrest extension 125 is extended, it is first pushed back inside footrest 110 prior to stowing. While the footrest is being stowed, the cables are unwound from cable reels 171, 172. During the final portion of stowing, extending members 141, 142 go over-center (see first gas extending member 141 in FIG. 7) to assist the user with stowing during the final few degrees of rotation. When footrest 110 has reached the fully stowed position (as depicted in FIG. 6 and FIG. 7), locking mechanism 180 secures footrest 110 in the stowed position (see FIG. 5).

Advantages of the presently disclosed upholstery-guided footrest include a footrest that automatically extends as it deploys, fits compactly in a small space when stowed, reaches a horizontal position when deployed, and needs a reduced force by the user to stow compared to other footrests. During the final portion of stowing when extending members 141, 142 go over-center, this coincides with the most difficult portion for the user to press the footrest. By going over-center, the gas springs are angled to assist the user with the final portion of stowing. Upholstery-guided footrest 110 provides an efficient and light-weight footrest that lacks complex mechanical assemblies, large locking gas springs, or electric motors.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An upholstery-guided footrest, comprising:
a footrest mechanically coupled to a seat, the footrest being configured for moving between a stowed position and one or more deployed positions; and
a flexible member having a first end and a second end opposite the first end, the first end being fastened to the seat and the second end being fastened to the footrest such that the flexible member supports the footrest during stowing,
wherein the flexible member has one or more straps of a non-stretchy material embedded within an upholstery cover, such that the flexible member is functionally non-stretchy.

2. The upholstery-guided footrest of claim 1, wherein the seat comprises a bottom cushion adapted for supporting a seated occupant, and the flexible member is arranged over an upper side of the bottom cushion and configured to bend around a frontside of the bottom cushion when the footrest is in the stowed position.

3. The upholstery-guided footrest of claim 1, wherein the flexible member comprises at least one non-stretchy material arranged such that the flexible member does not substantially elongate during stowing of the footrest.

4. The upholstery-guided footrest of claim 1, wherein the first end is fastened to the bottom cushion and the second end is fastened to the footrest.

5. The upholstery-guided footrest of claim 1, wherein the flexible member is sewn to the bottom cushion.

6. The upholstery-guided footrest of claim 2, wherein the bottom cushion includes two sections with a seam therebetween, and the first end of the flexible member is fastened to one or both sections of the bottom cushion within the seam so as to be hidden from view.

7. The upholstery-guided footrest of claim 2, wherein the flexible member is made of one or more bendable materials such that it may bend around the frontside of the bottom cushion and assume the shape of the frontside when the footrest is stowed.

8. The upholstery-guided footrest of claim 7, wherein at least one of the one or more bendable materials is non-stretchy such that a length of the flexible member is substantially maintained when under a load of the footrest.

9. The upholstery-guided footrest of claim 1, wherein the flexible member comprises a broad nylon strap provided as a backing of an upholstery cover, wherein the broad nylon strap substantially spans a width of the cover.

10. The upholstery-guided footrest of claim 1, wherein the flexible member has a tensile strength configured to support and guide the footrest during stowing.

11. A seat footrest, comprising:
a footrest attached to a seat, the footrest being stowable;
a flexible member fastened to the seat and the footrest;
while stowing the footrest, the flexible member bends around a frontside of the seat and is configured to guide and support the footrest into a stowed position; and
the footrest is slidable upon a pair of carriages that extend from a pair of supports pivotally coupled to a transversely oriented axle, wherein the flexible member is configured to guide the footrest to retract along the pair of carriages while the footrest is being stowed.

12. The seat footrest of claim 11, wherein the stowed position is based at least in part on a length of the flexible member in combination with a size and a shape of the frontside of the seat.

13. The seat footrest of claim 11, wherein the seat comprises a bottom cushion having a curved frontside such that the flexible member wraps around the frontside of the seat and conforms to a curved shape of the frontside while stowing the footrest.

14. The seat footrest of claim 13, wherein the footrest is oriented past vertical when stowed such that the footrest angles beneath the frontside of the bottom cushion.

15. The seat footrest of claim 11, further comprising a cable reel configured to automatically extend the footrest along the pair of carriages as the footrest is deployed.

16. The seat footrest of claim 11, wherein the footrest comprises a pair of extending members configured to extend the footrest to a substantially horizontal orientation when the footrest is fully deployed.

17. The seat footrest of claim 16, wherein the pair of extending members are adapted to rotate over-center during a final stage of stowing such that the pair of extending members push the footrest inwardly and upwardly under the frontside of the bottom cushion to assist with completion of stowing.

18. The seat footrest of claim 11, further comprising a supporting linkage configured to support the footrest and assist with guiding the footrest through a final stage of stowing, thereby preventing the footrest from moving below a predetermined lower limit.

19. A seat footrest, comprising:
a footrest attached to a seat, the footrest being stowable;
a flexible member fastened to the seat and the footrest;
a pair of carriages fastened to an underside of the footrest such that the footrest is slidable upon the pair of carriages; and
while stowing the footrest, the flexible member bends around a frontside of the seat and is configured to guide the footrest to retract along the pair of carriages into a stowed position.

20. The seat footrest of claim 19, wherein the flexible member has one or more straps of a non-stretchy material embedded within an upholstery cover, such that the flexible member is functionally non-stretchy.

* * * * *